United States Patent
Tanaka

(10) Patent No.: US 10,406,864 B2
(45) Date of Patent: Sep. 10, 2019

(54) TIRE

(71) Applicant: SUMITOMO RUBBER INDUSTRIES, LTD., Kobe-shi, Hyogo (JP)

(72) Inventor: Kouichirou Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 237 days.

(21) Appl. No.: 15/342,423

(22) Filed: Nov. 3, 2016

(65) Prior Publication Data
US 2017/0144488 A1  May 25, 2017

(30) Foreign Application Priority Data

Nov. 24, 2015 (JP) .................................. 2015-228581

(51) Int. Cl.
*B60C 11/03* (2006.01)
*B60C 11/12* (2006.01)

(52) U.S. Cl.
CPC ...... *B60C 11/0304* (2013.01); *B60C 11/0306* (2013.01); *B60C 11/12* (2013.01); *B60C 2011/0341* (2013.01); *B60C 2011/0344* (2013.01); *B60C 2011/0346* (2013.01); *B60C 2011/0353* (2013.01); *B60C 2011/0358* (2013.01); *B60C 2011/0365* (2013.01); *B60C 2011/0383* (2013.01); *B60C 2011/1213* (2013.01)

(58) Field of Classification Search
CPC . B60C 11/0304; B60C 11/0306; B60C 11/12; B60C 11/0341; B60C 11/0344; B60C 11/0346
See application file for complete search history.

(56) References Cited

U.S. PATENT DOCUMENTS 4,462,446 A * 7/1984 Goergen ................. B60C 11/04
152/209.18
4,690,189 A * 9/1987 Bradisse ............. B60C 11/0302
152/209.15
(Continued)

FOREIGN PATENT DOCUMENTS

JP          2015-310 A        1/2015
JP       2016097779 A  *     5/2016
(Continued)

*Primary Examiner* — Jodi C Franklin
(74) *Attorney, Agent, or Firm* — Birch, Stewart, Kolasch & Birch, LLP

(57) ABSTRACT

A tire includes a tread portion provided with at least one circumferentially and continuously extending shoulder main groove and at least one circumferentially and continuously extending crown main groove. The at least one crown main groove extends in a straight manner in a tire circumferential direction. The at least one shoulder main groove includes narrow segments inclined at angles with respect to the tire circumferential direction and wide segments each having widths greater than widths of the narrow segments. The narrow segments and the wide segments are arranged alternately in the tire circumferential direction so as to form a zigzag groove shape, wherein the widths of the narrow segments are in a range of from 5% to 7% of a tread width.

10 Claims, 4 Drawing Sheets

(56) References Cited

U.S. PATENT DOCUMENTS

| | | | | |
|---|---|---|---|---|
| 4,736,783 A | * | 4/1988 | Motomura | B60C 9/2006 152/209.22 |
| 4,807,679 A | * | 2/1989 | Collette | B60C 11/0306 152/209.18 |
| 5,012,847 A | * | 5/1991 | Fukumoto | B60C 11/0306 152/209.18 |
| 5,099,899 A | * | 3/1992 | Takeuchi | B60C 11/0309 152/209.21 |
| 5,198,047 A | * | 3/1993 | Graas | B60C 11/0302 152/209.18 |
| 5,361,815 A | * | 11/1994 | Loser | B60C 11/0306 152/209.19 |
| 5,580,404 A | * | 12/1996 | Hitzky | B60C 11/0306 152/209.22 |
| 5,746,849 A | * | 5/1998 | Hutson | B60C 11/0302 152/209.22 |
| D399,797 S | * | 10/1998 | Bergstrom | D12/596 |
| D413,844 S | * | 9/1999 | Graas | D12/585 |
| 6,164,354 A | * | 12/2000 | Yamakage | B60C 11/0302 152/209.18 |
| 8,875,759 B2 | * | 11/2014 | Hamada | B60C 3/04 152/209.18 |
| 9,211,768 B2 | * | 12/2015 | Inoue | B60C 11/12 |
| 9,757,991 B2 | * | 9/2017 | Tagashira | B60C 11/1259 |
| 2006/0005905 A1 | * | 1/2006 | Croissant | B60C 11/0302 152/154.2 |
| 2008/0047643 A1 | * | 2/2008 | Takahashi | B60C 11/0306 152/209.26 |
| 2012/0160384 A1 | * | 6/2012 | Amano | B60C 11/042 152/209.18 |
| 2014/0020803 A1 | * | 1/2014 | Fujita | B60C 11/03 152/209.18 |
| 2014/0138000 A1 | * | 5/2014 | Inoue | B60C 11/1392 152/209.8 |
| 2014/0283967 A1 | * | 9/2014 | Inoue | B60C 11/12 152/209.18 |
| 2014/0311638 A1 | * | 10/2014 | Takagi | B60C 11/0302 152/209.8 |
| 2014/0326382 A1 | * | 11/2014 | Iwata | B60C 11/0306 152/209.18 |
| 2015/0041034 A1 | * | 2/2015 | Matsushita | B60C 11/04 152/209.24 |
| 2015/0059940 A1 | * | 3/2015 | Kouda | B60C 11/11 152/209.8 |
| 2015/0191052 A1 | * | 7/2015 | Okabe | B60C 11/125 152/209.18 |
| 2016/0152087 A1 | * | 6/2016 | Hayashi | B60C 11/1392 152/209.18 |
| 2016/0152091 A1 | * | 6/2016 | Yoshida | B60C 11/11 152/209.18 |
| 2016/0257172 A1 | * | 9/2016 | Mukai | B60C 11/1315 |
| 2017/0050470 A1 | * | 2/2017 | Kanematsu | B60C 11/0304 |

FOREIGN PATENT DOCUMENTS

| | | | | |
|---|---|---|---|---|
| WO | WO-2013048682 A1 | * | 4/2013 | B60C 11/0332 |
| WO | WO-2015005291 A1 | * | 1/2015 | B60C 11/11 |

* cited by examiner

TIRE

BACKGROUND ART

Field of the Invention

The present invention relates to tires and more particularly to a pneumatic tire for automobile capable of improving snow and wet performance while maintaining wear resistance.

Description of the Related Art

Japanese Unexamined Patent Application Publication No. 2015-000610 discloses a tire with a tread which is provided with circumferentially and continuously extending zigzag main grooves and circumferentially and continuously extending straight main grooves disposed on laterally outsides the zigzag main grooves. The tire disclosed in the publication may improve wet performance by dispersing water smoothly from under the tread using the straight main grooves. Furthermore, the zigzag main grooves may improve snow performance by increasing snow shearing force since the zigzag main grooves include a lot of lateral components.

However, tires having further improved wet and snow performance have been required.

SUMMARY OF THE INVENTION

In view of the above problems in the conventional art, the present invention has a major object to provide a tire that may improve snow and wet performance while maintaining wear resistance.

In one aspect of the present invention, a tire includes a tread portion provided with at least one circumferentially and continuously extending shoulder main groove and at least one circumferentially and continuously extending crown main groove. The at least one crown main groove extends in a straight manner in a tire circumferential direction. The at least one shoulder main groove includes narrow segments inclined at angles with respect to the tire circumferential direction and wide segments each having widths greater than widths of the narrow segments, the narrow segments and the wide segments being arranged alternately in the tire circumferential direction so as to form a zigzag groove shape, wherein the widths of the narrow segments are in a range of from 5% to 7% of a tread width.

In another aspect of the invention, the at least one shoulder main groove may includes a pair of shoulder main grooves to form adjacent first and second crown portions through the at least one crown main groove therebetween. The first crown portion may be provided with lateral grooves extending across the first crown portion. The second crown portion may be provided with lug grooves extending from the at least one crown main groove and terminating in ends positioned within the second crown portion. The respective lug grooves may be shifted from the respective lateral grooves in the tire circumferential direction.

In another aspect of the invention, extension lines of groove centerlines of the lateral grooves may be spaced at gaps, in the tire circumferential direction, from circumferential center points of the lug grooves at its axially inner ends.

In another aspect of the invention, the gaps may be set in a range of from 30% to 55% of groove widths of the lateral grooves.

In another aspect of the invention, the lateral grooves may extend from the wide segments of the shoulder main grooves.

In another aspect of the invention, the at least one crown main groove may be configured as a single crown main groove disposed on a tire equator. The second crown portion may be further provided with lateral grooves extending across the second crown portion. The first crown portion may be further provided with lug grooves extending from the crown main groove and terminating in ends positioned within the first crown portion.

In another aspect of the invention, the wide segments may be inclined in the same direction as the narrow segments.

DESCRIPTION OF THE PREFERRED EMBODIMENTS

An embodiment of the present invention will be explained below with reference to the accompanying drawings.

Figure 1:
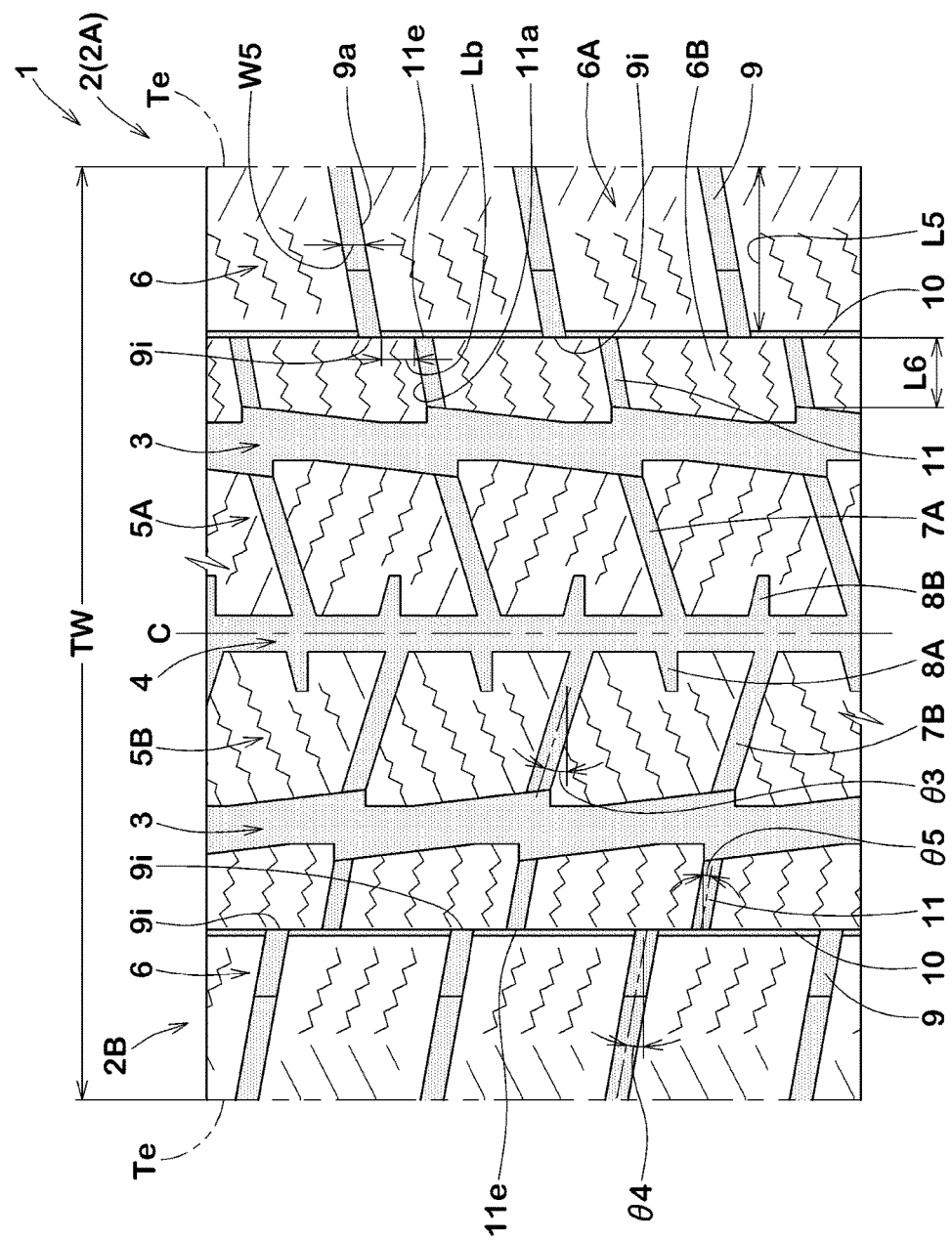
FIG. 1 is a development view of a tread portion of a tire according to an embodiment of the present invention.

FIG. 1 illustrates a development view of a tread portion 2 of a tire 1 according to an embodiment of the present invention. The tire 1 according to the invention can be used as pneumatic tires for passenger car and heavy duty vehicle. Furthermore, the present invention can also be used as airless tires that can carry a load by its structural components without the support of gas inflation. In this embodiment, the tire 1, for example, is embodied as a pneumatic tire for passenger car.

The tread portion 2 is provided with at least one circumferentially and continuously extending shoulder main groove 3 on the side of either one of tread edges Te and at least one circumferentially and continuously extending crown main groove 4 disposed axially inward of the shoulder main groove 3. In this embodiment, the at least one shoulder main groove 3 includes a pair of shoulder main grooves each of which is arranged on each side of the tire equator C. In this embodiment, a single crown main groove 4 is arranged on the tire equator C. Alternatively, at least one crown main groove 4 may include a pair of crown main grooves 4 arranged such that the tire equator C is located therebetween.

As used herein, the tread edges Te refer to axially outermost edges of the ground contacting patch of the tread portion 2 which occurs under a standard condition with a standard tire load when the camber angle of the tire is set to zero.

As used herein, the standard condition is such that the tire 1 is mounted on a standard wheel rim with a standard pressure, but is loaded with no tire load. In this application including specification and claims, various dimensions, positions and the like of the tire 1 refer to those under the standard condition of the tire unless otherwise noted.

As used herein, the tread width TW is defined as an axial distance between the tread edges Te and Te under a standard condition of the tire 1.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tire, however, the standard pressure is uniformly defined as 180 kPa.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like. In case of passenger car tires, however, the standard tire load is uniformly defined as 88% of the maximum tire load.

The crown main groove 4 extends in a straight manner in the tire circumferential direction. This structure may be helpful to disperse water effectively from under a surface of the tread portion 2 around the tire equator C to improve wet performance of the tire while ensuring tread rigidity.

Preferably, the crown main groove 4 has a depth in a range of from 9.0 to 10.0 mm, for example.

Figure 2:
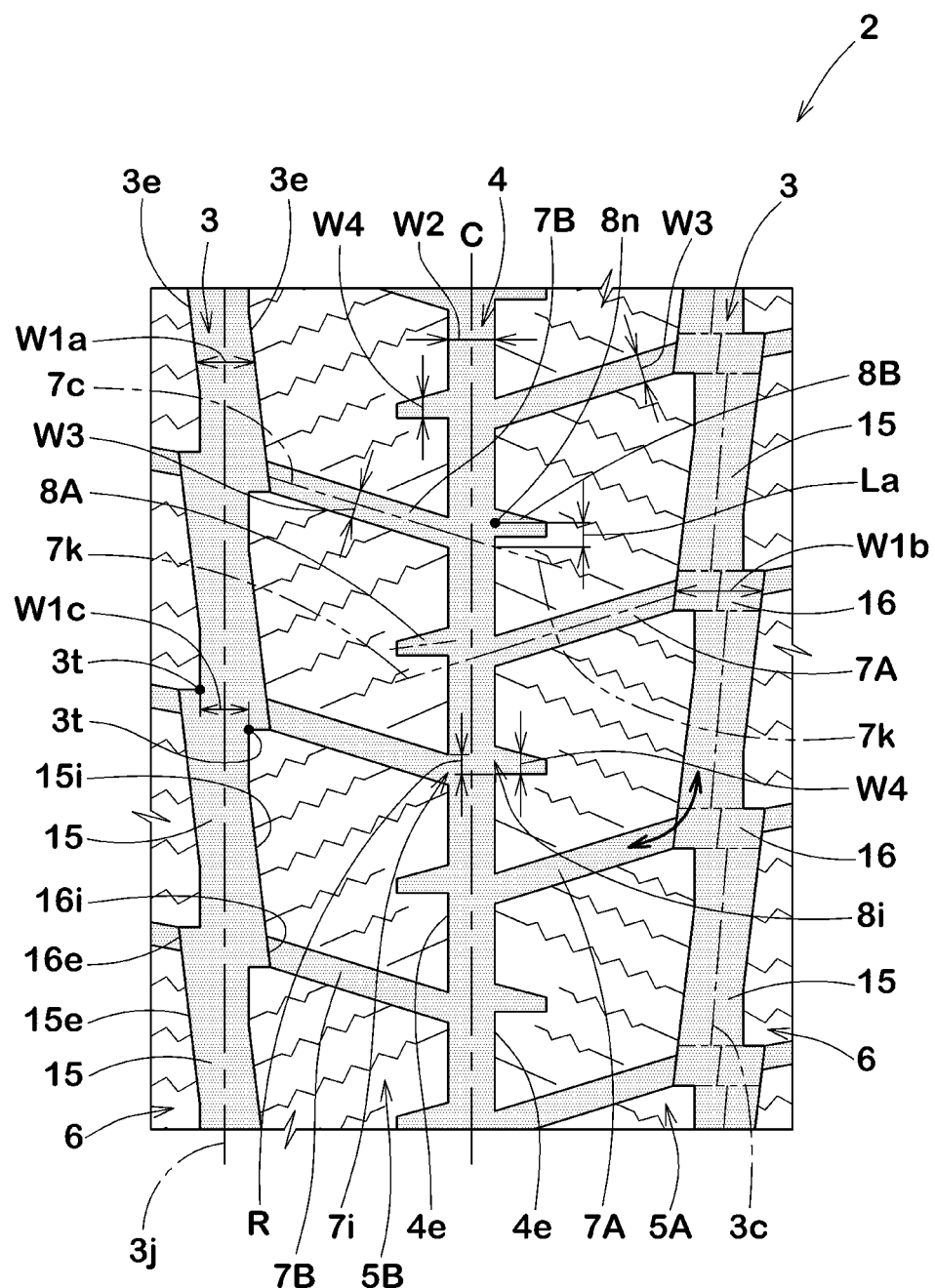
FIG. 2 is an enlarged view of crown portions of the tread portion of FIG. 1.

As illustrated in FIG. 2, each of the shoulder main grooves 3 includes narrow segments 15 inclined at angles with respect to the tire circumferential direction and wide segments 16 each having widths greater than widths of the narrow segments 15, and the narrow segments 15 and the wide segments 16 are arranged alternately in the tire circumferential direction so as to form a zigzag groove shape. The narrow segments 15 may be useful to improve wear resistance of the tread portion 2 since respective tread land portions which are on both sides of the narrow segments 15 may be maintained sufficient rigidity. Furthermore, the narrow segments 15 may also be useful to improve wet performance. The wide segments 16 may generate high snow-shearing force since they include lateral components. Consequently, the tire 1 according to the embodiment may improve snow and wet performance. As used herein, an inclination direction or an angle of a circumferentially extending groove respectively refers to the inclination direction or the angle of the groove centerline that passes through axially center points between groove edges.

The narrow segments 15, in this embodiment, extend in a straight manner. This configuration may be useful to improve wear resistance of the tread portion 2 since rigidity of a tread land portion around the narrow segments 15 can be maintained sufficiently.

The axial widths W1a of the narrow segments 15 are set in a range of from 5% to 7% of the tread width TW. This feature may promote to discharge snow or water from the shoulder main grooves 3 smoothly, and may maintain sufficient rigidity of tread land portions on both sides of the narrow segments 15. When the widths W1a of the narrow segments 15 are less than 5% of the tread width TW, it may be difficult to discharge snow or water from the grooves 3. When the widths W1a of the narrow segments 15 are more than 7% of the tread width TW, rigidity of the tread land portions on both sides of the narrow segments 15 tend to be lower and would bring poor wear resistance. As described above, the tire 1 according to the embodiment enables to travel on snow stably by offering suitable traction even at the time of cornering while maintaining sufficient tread rigidity.

Furthermore, an excellent wet performance can be obtained by smoothly dispersing water from under a surface of the tread portion 2 around the tire equator C.

Preferably, the widths W1a of the narrow segments 15 are greater than the width W2 of the crown main groove 4. Thus, drainage performance of shoulder tread region around the respective shoulder main grooves 3 can be improved while maintaining sufficient rigidity of the tread crown region around the tire equator C. Consequently, wear resistance and wet performance can be improved in a well balanced manner. In view of the above, the widths W1a of the narrow segments 15 of the shoulder main groove 3 are preferably in a range of from 1.2 to 1.4 times the width W2 of the crown main groove 4.

In this embodiment, the wide segments 16 extend in a straight manner and are inclined in the same direction as the narrow segments 15. This feature allows snow and water in the shoulder main grooves 3 to flow smoothly backwardly, thereby improving wet performance and snow discharging performance.

Each of the wide segments 16, in this embodiment, is arranged in such a manner that a circumferential first groove edge 16i thereof is communicated with one circumferential groove edge 15i, which is located above the first groove edge 16i in FIG. 2, of the narrow segments 15 to form a single continuous linear edge. Furthermore, each of the wide segments 16 is arranged in such a manner that a second circumferential groove edge 16e thereof is communicated with the other one circumferential groove edges 15e, which is located below the second groove edge 16e in FIG. 2, of the narrow segments 15 to form a single continuous linear edge. This groove structure may allow water and snow to flow more smoothly between narrow segments 15 through the wide segments 16, thereby further improving wet performance and snow discharging performance.

Note that the axial widths W1b of the wide segments 16 are not particularly limited, but preferably in a range of from about 1.2 to 1.6 times the widths W1a of the narrow segments 15 in order to increase snow-shearing force while maintaining sufficient tread rigidity.

Preferably, each centerline 3j of amplitude of the zigzag shoulder main grooves 3 is located at a distance Ls of from 15% to 25% of the tread width TW from the tire equator C on each side of the tire equator C. This may balance the axial rigidity of land portions disposed on both sides of the respective shoulder main grooves with each other to improve wear resistance. Here, the amplitude of the zigzag shoulder main groove 3 is defined based on the groove centerline 3c.

Each of the shoulder main grooves 3 includes internal apexes 3t located closest to the centerline 3j on its both groove edges 3e and 3e. Preferably, the axial distance W1c between a pair of internal apexes 3t and 3t facing each other is in a range of from 45% to 65% of the widths W1b of the wide segments 16. In the respective regions represented by the axial distance W1c of the shoulder main groove 3, water flows smoothly. Thus, when the axial distance W1c is less than 45% of the widths W1b of the wide segments 16, wet performance or snow discharging performance may be deteriorated. On the other hand, when the axial distance W1c is more than 65% of the widths W1b of the wide segments 16, snow-shearing force may be deteriorated with reduction of axial edge components of the shoulder main grooves 3.

Preferably, the depths of the shoulder main grooves 3 are set in a range of from 9.0 to 10.0 mm, for example.

As illustrated in FIG. 1, the tread portion 2 is separated into adjacent first and second crown portions 5A and 5B and a pair of shoulder portions 6 by the shoulder main grooves 3 and the crown main groove 4. Each of the crown portions 5A and 5 B, in this embodiment, is disposed between adjacent shoulder main groove 3 and crown main groove 4. Each of the shoulder portions 6, in this embodiment, is disposed between adjacent shoulder main groove 3 and tread edge Te on each side of the tire equator C.

As illustrated in FIG. 2, the first crown portion 5A is provided with lateral grooves 7A extending across the first crown portion 5A. The second crown portion 5B is provided with lug grooves 8A extending from the crown main groove 4 and terminating in ends positioned within the second crown portion 5B. Since the lateral grooves 7A and the lug grooves 8A include lateral edge components, snow performance of the tire 1 can be improved. Furthermore, since the lateral grooves 7A provide passages where water can flow from either one of main grooves 3 and 4 to the other one of main grooves 3 and 4, wet performance of the tire can also be improved.

Extension lines 7k of groove centerlines 7c of the lateral grooves 7A are shifted from the lug grooves 8A in the tire circumferential direction. This configuration may improve wet performance of the tire since much water flowing toward the crown main groove 4 through the lateral grooves 7A would be introduced to the crown main groove 4 smoothly by being guided by one of the groove walls 4e of the crown main groove 4. In contrast, when the extension lines 7k of groove centerlines 7c of the lateral grooves 7A are not shifted from the lug grooves 8A in the tire circumferential direction, much water flowing toward the crown main groove 4 through the lateral grooves 7A would be introduced to the lug grooves 8 and therefore turbulence may be generated in the crown main groove 4. The turbulence may cause to slow down the flow of water in the crown main groove 4, thereby deteriorating wet performance. In particular, stagnation of water in the crown main groove 4, which is arranged on or near the tire equator C, may cause hydroplaning-phenomenon on a vehicle at a relatively low traveling speed.

When the extension lines 7k of the lateral grooves 7A are shifted excessively from the lug grooves 8A, snow performance of the tire may be deteriorated since timing of generating snow-shearing force by the lateral grooves 7A and the lug grooves 8 differs from each other. That is, gaps between adjacent lateral groove 7A and lug groove 8A through the crown main groove 4 is preferably smaller in values in view of improving snow performance. From this point of view, adjacent lateral groove 7A and lug groove 8A through the crown main groove 4 is preferably overlapped at least partially in the tire circumferential direction with each other at their respectively ends 7i and 8i which are in communication with the crown main groove 4. FIG. 2 shows an overlapping portion of adjacent lateral groove 7A and lug groove 8A through the crown main groove 4 as the reference symbol "R".

In order to further improve the advantageous effect, extension lines 7k of groove centerlines 7c of the lateral grooves 7A are preferably spaced at gaps La, in the tire circumferential direction, from circumferential center points 8n of the lug grooves at its axially inner ends 8i in a range of from 30% to 55% of the widths W3 of the lateral grooves 8A. Thus, the tire 1 according to the present embodiment may improve wet performance and snow performance through an improved arrangement of grooves where the lateral grooves 7A and the lug grooves 8A are associated with each other.

In this embodiment, the second crown portion 5B is further provided with lateral grooves 7B extending across the second crown portion 5B, and the first crown portion 5A is further provided with lug grooves 8B extending from the crown main groove 4 and terminating in ends positioned within the first crown portion 5A. The lateral grooves 7B and the lug grooves 8B are associated with each other in the same manner as the relation between the lateral grooves 7B and the lug grooves 8B.

Preferably, each of the lateral grooves 7A and 7B extends from one of the wide segments 16. This structure, during traveling on snow, may be useful to improve snow performance by forming a laterally long snow column by one of the lateral grooves 7A and 7B connected to one of the wide segments 16.

In this embodiment, each of the lateral grooves 7A and 7B is inclined in the same direction as the narrow segments 15 to which the lateral groove is connected. As illustrated by an arrow in FIG. 2, the flow of water in the respective lateral grooves 7 may be introduced to either one of the shoulder main grooves 3 smoothly.

Each of the lug grooves 8A and 8B has a width W4 which increases gradually toward the crown main groove 4. This structure may be useful to not only disperse water through the crown main groove 4 but also to push out snow toward to the crown main groove 4 in order to improve wet and snow performance.

Each of the lug grooves 8A and 8B is inclined in the same direction as the lateral groove 7 to which the lug groove is adjacent through the crown main groove 4. That is, the lug grooves 8A are inclined in the same direction as the lateral grooves 7A, and the lug grooves 8B are inclined in the same direction as the lateral grooves 7B. This structure may be useful to form harder snow columns by compression effect where snow in the lateral grooves 7A and 7B is respectively forwarded smoothly to the lug grooves 8A and 8B and is then strongly compressed thereto.

Preferably, the lug grooves 8A and 8B and the lateral grooves 7 A and 7B have depths in a range of from 4.5 to 6.0 mm.

As illustrated in FIG. 1, each of the shoulder portions 6 is provided with outer shoulder lug grooves 9, narrow shoulder longitudinal grooves 10 and inner shoulder lug grooves 11. The outer shoulder lug grooves 9 according to the embodiment extend axially inwardly from the tread edge Te and terminate in ends 9i positioned within the shoulder portions 6. In this embodiment, the narrow shoulder longitudinal grooves 10 extend so as to communicate circumferentially adjacent outer shoulder lug grooves 9. Each of the inner shoulder lug grooves 11 extends axially outwardly from the shoulder main groove 3 to one of the narrow shoulder longitudinal grooves 10, and terminates thereto.

Each of the shoulder portions 6 is separated into a plurality of outer shoulder blocks 6A and a plurality of inner shoulder blocks 6B. The outer shoulder blocks 6A are defined by circumferentially adjacent outer shoulder lug grooves 9, the tread edge Te and narrow shoulder longitudinal grooves 10. The inner shoulder blocks 6B are defined by circumferentially adjacent inner shoulder lug grooves 11, the shoulder main groove 3 and the narrow shoulder longitudinal grooves 10.

Each of the outer shoulder lug grooves 9 and the inner shoulder lug grooves 11 extends in a straight manner with a substantially constant width so as to define the outer and inner shoulder blocks 6A and 6B in a rectangular shape with a well balanced rigidity.

In this embodiment, the axially inner ends 9i of the outer shoulder lug grooves 9 are shifted, in the tire circumferential direction, from the axially outer ends 11e of the inner shoulder lug grooves 11.

In this embodiment, circumferential gaps Lb between adjacent grooves edges 9a and 11a of adjacent outer shoulder lug groove 9 and inner shoulder lug grooves 11 respectively through the narrow shoulder longitudinal grooves 10 are greater than the circumferential widths W5 of the inner ends 9i of the outer shoulder lug grooves 9. This structure may suppress reduction in rigidity of the shoulder portions 6 and maintain sufficient groove volume in each groove 9 and 11 upon grounding since the respective outer shoulder lug grooves 9 can come into contact with the ground at different timing from the respective inner shoulder lug grooves 11. Thus, snow performance can further be improved.

Preferably, an angle θ4 of each of the outer shoulder lug groove 9 with respect to the tire axial direction and an angle θ5 of each of the inner shoulder lug grooves 11 are smaller than an angle θ3 of each of the lateral grooves 7 with respect to the tire axial direction. Thus, the shoulder portions which tend to receive large lateral force upon cornering can exhibit high lateral rigidity, and therefore snow performance can further be improved. In this embodiment, on each side of the tire equator C, the outer shoulder lug grooves 9, the inner shoulder lug grooves 11 and the lateral grooves 7 are inclined in the same direction with respect to the tire axial direction.

Preferably, the outer shoulder lug grooves 9 have axial lengths L5 greater than axial lengths L6 of the inner shoulder lug grooves 11 in order to improve wear resistance of the tread portion by offering sufficient lateral rigidity to the outer shoulder blocks 6A.

In this embodiment, the narrow shoulder longitudinal grooves 10 extend straightly along the tire circumferential direction with a substantially constant width. The narrow shoulder longitudinal grooves 10 may be useful to ensure increased lateral grip on snow since they can offer long circumferential edge components.

In this embodiment, the tread portion 2 includes the right half pattern 2A and the left half pattern 2B and which are designed in a substantially line symmetrical manner from each other. Note that the right half pattern 2A and the left half pattern 2B are shifted in the tire circumferential direction at a substantially half arrangement pitch of the lateral grooves as illustrated in FIG. 1.

While the particularly preferable embodiments in accordance with the present invention have been described in detail, the present invention is not limited to the illustrated embodiments, but can be modified and carried out in various aspects.

EXAMPLE

Studless tires 205/65R16 with a basic tread pattern illustrated in FIG. 1 were manufactured based on details shown in Table 1 to evaluate their snow performance, wet performance and wear resistance. The same sipes as well as the same grooves on the shoulder portions are applied in each of the test tires. Major common specifications and test method are as follows:
Depths of shoulder main grooves: 9.6 mm
Depths of crown main groove: 9.6 mm
Depths of lateral grooves: 6.0 mm
Depths of lug grooves: 5.0 mm
Snow performance test:
Each test tire was mounted on a four-wheel-drive vehicle as the all wheels under the following conditions, and then a driver drove the test vehicle with two passengers on a 1000 m long test course covered with snow to measure the best lap time in three laps. The test results are shown in Table 1 with an index defined in such a manner that a larger value means a better performance, wherein the value of Ref. 1 is set to 100.
Rim size: 16×6.5J
Internal pressure (front/rear): 390 kPa/350 kPa
Displacement of test vehicle: 2000 cc
Wet performance test:
A driver drove the test vehicle on a test course covered with water to evaluate steering stability by his sense. The test results are shown in Table 1 with a score defined in such a manner that a larger value means a better wet performance, wherein the value of Ref. 1 is set to 100.
Wear resistance test:
After the test vehicle was made to run on a test course with dry surfaces for 20,000 km, amounts of wear of the main grooves and lateral grooves on the respective rear wheels were measured at eight points in the tire circumferential direction, and then the average of the wear amounts was calculated. The smaller the value, the better the performance is.
Test results are shown in Table 1.

TABLE 1

Figure 3:
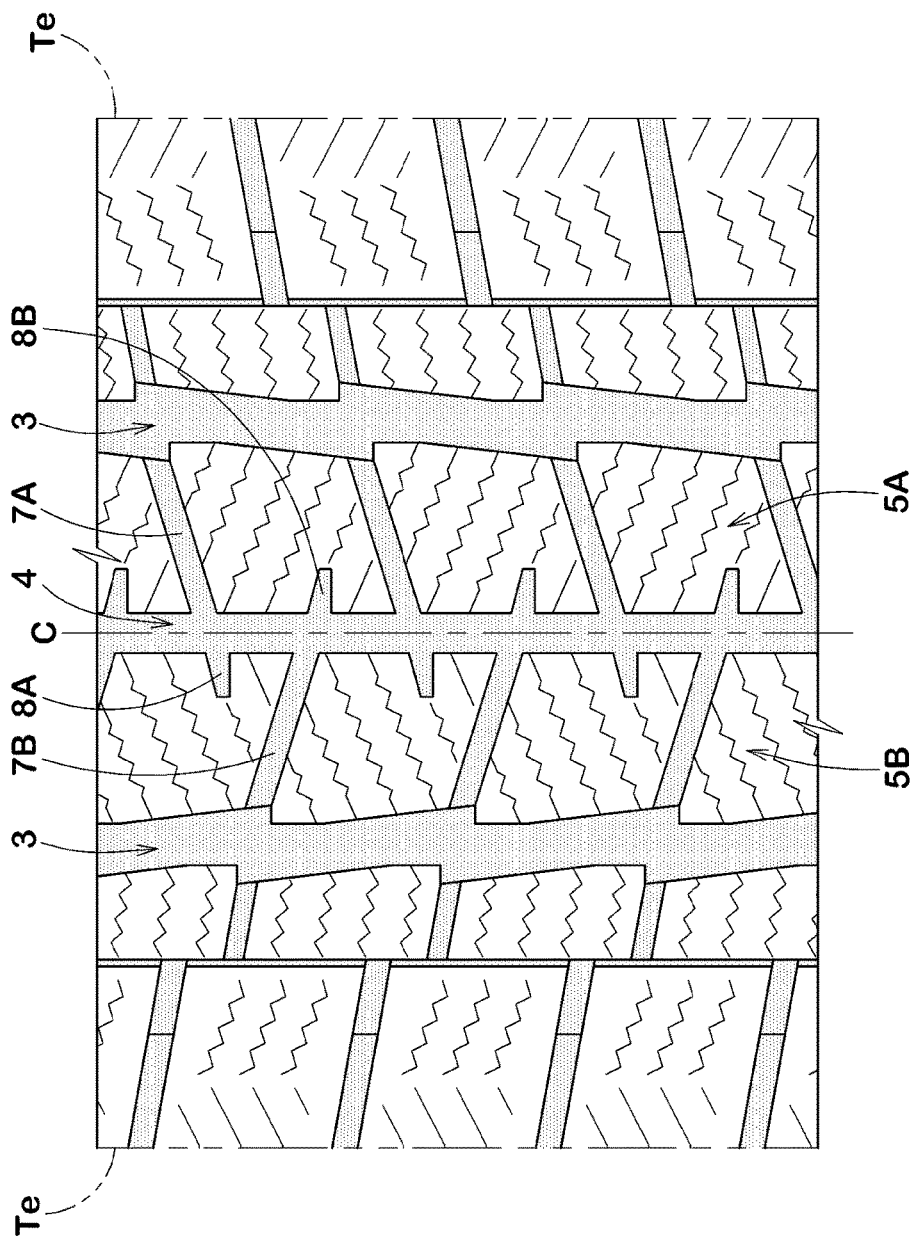
FIG. 3 is a development view of the tread portion according to another embodiment of the present invention.
Figure 4:
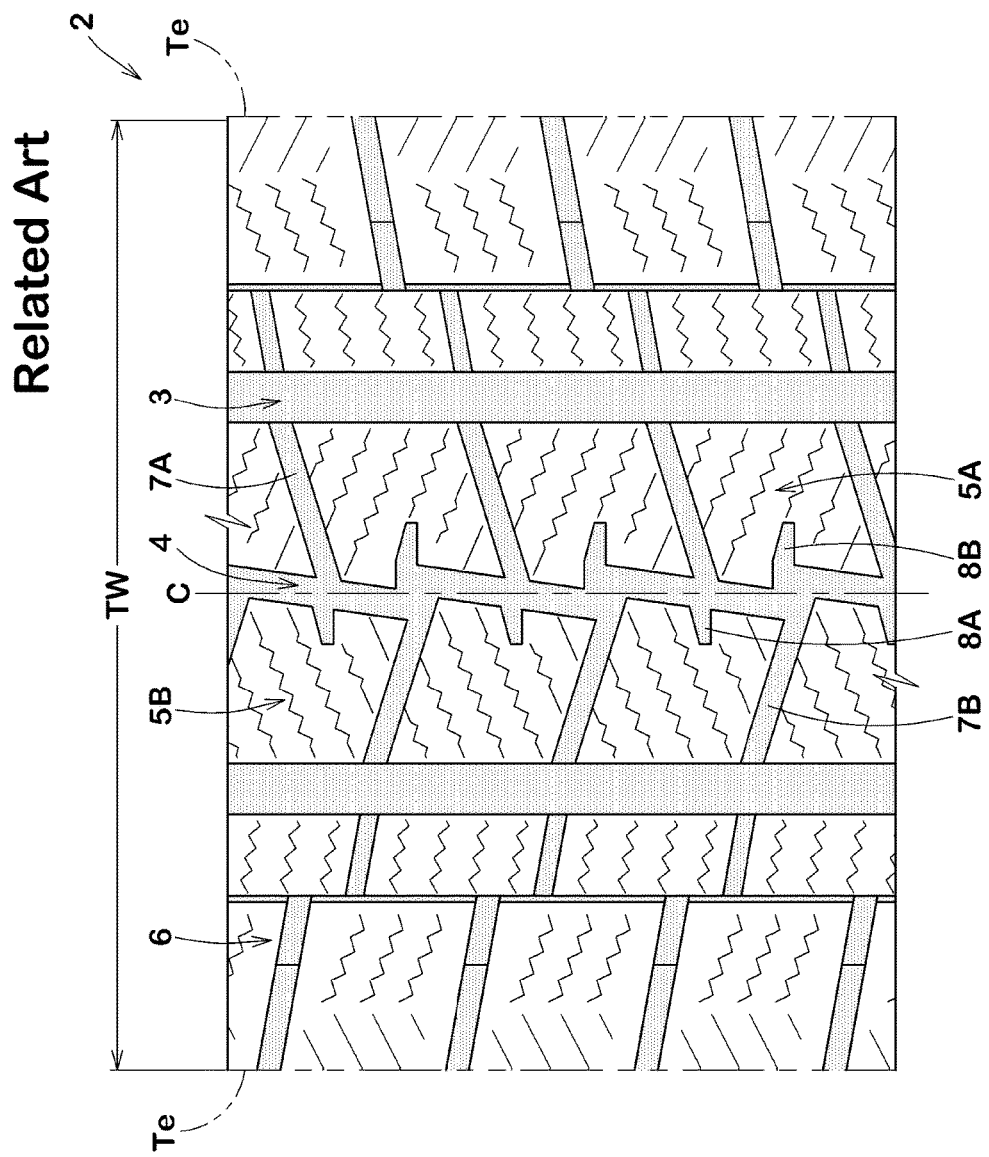
FIG. 4 is a development view of a tread portion according to a comparative example.

| Tread pattern | Ref 1 FIG. 4 | Ref 2 FIG. 1 | Ex. 1 FIG. 1 | Ex. 2 FIG. 1 | Ex. 3 FIG. 1 | Ref. 3 FIG. 1 | Ex. 4 FIG. 3 | Ex. 5 FIG. 1 | Ex. 6 FIG. 1 |
|---|---|---|---|---|---|---|---|---|---|
| Ratio W1a/TW (%) | 6 | 4 | 6 | 5 | 7 | 8 | 6 | 6 | 6 |
| Ratio La/W3 (%) | 40 | 40 | 40 | 40 | 40 | 40 | 58 | 25 | 30 |
| Ratio Ls/TW (%) | 20 | 20 | 20 | 20 | 20 | 20 | 20 | 20 | 20 |
| Ratio W1a/W2 (%) | 130 | 130 | 130 | 130 | 130 | 130 | 130 | 130 | 130 |
| Snow performance [index] | 100 | 103 | 110 | 108 | 111 | 112 | 113 | 108 | 109 |
| Wet performance [score] | 100 | 103 | 110 | 109 | 112 | 113 | 106 | 111 | 111 |
| Wear resistance [mm] | 3 | 3.1 | 3.2 | 3.1 | 3.3 | 3.7 | 3.1 | 3.2 | 3.2 |

| Tread pattern | Ex. 7 FIG. 1 | Ex. 8 FIG. 1 | Ex. 9 FIG. 1 | Ex. 10 FIG. 1 | Ex. 11 FIG. 1 | Ex. 12 FIG. 1 | Ex. 13 FIG. 1 | Ex. 14 FIG. 1 | Ex. 15 FIG. 1 | Ex. 16 FIG. 1 |
|---|---|---|---|---|---|---|---|---|---|---|
| Ratio W1a/TW (%) | 6 | 6 | 6 | 6 | 6 | 6 | 6 | 6 | 6 | 6 |
| Ratio La/W3 (%) | 55 | 60 | 40 | 40 | 40 | 40 | 40 | 40 | 40 | 40 |
| Ratio Ls/TW (%) | 20 | 20 | 12 | 15 | 25 | 30 | 20 | 20 | 20 | 20 |
| Ratio W1a/W2 (%) | 130 | 130 | 130 | 130 | 130 | 130 | 110 | 120 | 140 | 150 |

TABLE 1-continued

| Snow performance [index] | 111 | 111 | 112 | 111 | 111 | 111 | 111 | 110 | 110 | 109 |
|---|---|---|---|---|---|---|---|---|---|---|
| Wet performance [score] | 109 | 108 | 107 | 109 | 109 | 108 | 113 | 112 | 109 | 107 |
| Wear resistance [mm] | 3.2 | 3.3 | 3.2 | 3.1 | 3.1 | 3.2 | 3.3 | 3.2 | 3.1 | 2.9 |

From the test results, it is confirmed that the example tires improve wet and snow performance while maintaining wear resistance as compared with the comparative example tires. Also, the same results were confirmed in another test conducted using different tire in size.

What is claimed is:

1. A tire comprising:
   a tread portion provided with a pair of circumferentially and continuously extending shoulder main grooves and a circumferentially and continuously extending crown main groove to form adjacent first and second crown portions through the crown main groove between the pair of shoulder main grooves;
   the crown main groove extending straight along a tire circumferential direction and positioned substantially at a center of the tire;
   the pair of shoulder main grooves comprising narrow segments inclined at angles with respect to the tire circumferential direction and wide segments having widths greater than widths of the narrow segments, the narrow segments and the wide segments being arranged alternately in the tire circumferential direction so as to form a zigzag groove shape, wherein the widths of the narrow segments are in a range of from 5% to 7% of a tread width;
   the first crown portion being provided with lateral grooves extending across the first crown portion; and
   the second crown portion being provided with lug grooves extending from the crown main groove and terminating in ends positioned within the second crown portion, wherein an end extending from the crown main groove of a respective lug groove is shifted in the tire circumferential direction from an end extending from the crown main groove of one lateral groove located nearest to the respective lug groove,
   wherein each lug groove includes a first surface extending in a direction perpendicular to the circumferential direction of the tire, and a second surface extending in a direction inclined with respect to the width direction of the tire.

2. The tire according to claim 1, wherein an extension line of a groove centerline of the respective lateral groove is spaced at a gap in the tire circumferential direction from a circumferential center point at its axially inner end of the respective lug groove located nearest to the respective lateral groove.

3. The tire according to claim 2, wherein the gap is in a range of from 30% to 55% of a groove width of the respective lateral groove.

4. The tire according to claim 1, wherein the lateral grooves extend from the wide segments of the shoulder main grooves.

5. The tire according to claim 1,
   wherein the second crown portion is further provided with lateral grooves extending across the second crown portion, and
   wherein the first crown portion is further provided with lug grooves extending from the crown main groove and terminating in ends positioned within the first crown portion.

6. The tire according to claim 1, wherein the wide segments are inclined in the same direction as the narrow segments.

7. The tire according to claim 1, wherein each of the lug grooves is inclined in a same direction as the lateral grooves with respect to a tire axial direction.

8. The tire according to claim 2, wherein each of the lug grooves is inclined in a same direction as the lateral grooves with respect to a tire axial direction.

9. The tire according to claim 1, wherein an extension line of groove center lines of the respective lateral groove is shifted from the respective lug groove in the tire circumferential direction.

10. The tire according to claim 1, wherein each lug groove has a width that increases gradually toward the crown main groove.

* * * * *